United States Patent

Yoshimi

[11] Patent Number: 5,959,685
[45] Date of Patent: Sep. 28, 1999

[54] CHARACTER DISPLAY APPARATUS

[75] Inventor: Akira Yoshimi, Kanagawa, Japan

[73] Assignee: Sony Corporation, Tokyo, Japan

[21] Appl. No.: 08/754,269

[22] Filed: Nov. 20, 1996

[30] Foreign Application Priority Data

Dec. 4, 1995 [JP] Japan .................................. 7-315488

[51] Int. Cl.[6] .............................. H04N 5/455; H04N 9/74
[52] U.S. Cl. ........................ 348/563; 348/564; 348/581; 348/582; 348/600
[58] Field of Search .................................. 348/582, 600, 348/468, 563, 581, 561, 524, 564, 589; 345/141, 25, 26, 193, 194, 125, 13; H04N 9/74, 5/455

[56] References Cited

U.S. PATENT DOCUMENTS

| | | | |
|---|---|---|---|
| 4,180,805 | 12/1979 | Burson | 340/709 |
| 4,595,953 | 6/1986 | Willis | 358/183 |
| 5,436,670 | 7/1995 | Tachibana | 348/581 |
| 5,532,741 | 7/1996 | Tsutsumi | 348/589 |
| 5,541,663 | 7/1996 | Ohno | 348/478 |
| 5,608,425 | 3/1997 | Movshovich | 345/141 |

*Primary Examiner*—John K. Peng
*Assistant Examiner*—Wesner SaJous
*Attorney, Agent, or Firm*—Jay H. Maioli

[57] ABSTRACT

According to this character display apparatus, a limit of a frequency band of a character display signal is removed and small characters, etc., also can be displayed satisfactorily. A sync signal from a sync separating circuit (4) is supplied to a character generating circuit (8) in which a display signal of arbitrary characters or the like is formed by RGB three primary color signals in synchronism with predetermined dot clocks. The thus formed display signal is supplied to a line memory (9) and dot clocks are supplied to the line memory (9) and thereby the display signal is written in the line memory (9). Further, dot clocks are supplied to a multiplying circuit (10) and clock multiplied with an arbitrary multiplying ratio are supplied to the line memory (9) so that the written display signal is read out from the line memory (9). The read out display signal is supplied to a superimposing circuit (5), in which it is superimposed upon the three primary color signals of video signal and supplied to a cathode-ray tube (6), thereby resulting in characters, etc., being displayed.

8 Claims, 1 Drawing Sheet

CHARACTER DISPLAY APPARATUS

FIELD OF THE INVENTION

The present invention relates to a character display apparatus, and more particularly relates to a character display apparatus used in a television receiver.

BACKGROUND OF THE INVENTION

Television receivers capable of displaying desired characters such as teletext on a picture displayed on a cathode-ray tube (CRT) in a superimposed fashion are commercially available on the market. In that case, known television receivers are adapted to add a character display signal generated by a character generating circuit or the like to a video signal immediately before a CRT.

On one hand, a television receiver having a CRT of a wide aspect ratio of 16:9 is now commercially available on the market. FIG. 1 of the accompanying drawings shows an example of such television receiver having a CRT of a wide aspect ratio.

If such television receiver displays a video signal formed with an aspect ratio of 4:3 by using the whole of a display screen, the video signal is inevitably enlarged in the horizontal direction and displayed. Accordingly, when a character display signal with a similar aspect ratio of 4:3 is displayed, characters to be displayed are enlarged in the horizontal direction.

On the other hand, a display apparatus in which a display screen is divided into multiple display screens such as two display screens and video signals thereof are compressed in the horizontal direction to thereby display substantially normal pictures are also commercially available on the market. However, a technique for compressing a character display signal has not yet been proposed so far. Accordingly, according to the above-mentioned method for adding the character display signal to the video signal immediately before the CRT, pictures cannot be displayed on the multiple display screens such as two display screens.

In television receivers capable of double-speed scanning in which a video signal is scanned by double scanning lines in order to prevent a flicker from being produced on a picture, when a video signal is processed in a double-scanning fashion, horizontal deflection is carried out at a speed twice the normal speed so that characters to be displayed are enlarged twice in the horizontal direction.

When characters, etc., are displayed by the television receiver in which a video signal is processed in a multiple-screen display fashion so that a picture is displayed on two display screens or the like and in a double-speed scanning fashion, character display signals of RGB three primary colors signal are temporarily converted in to video signals such as Y/U/V. The thus converted video signals are processed in a multiple-screen display fashion and in a double-speed scanning fashion together with other video signals, thereby pictures being displayed on two display screens or the like in a multiple-screen display fashion.

However, when such processing is carried out, a frequency band used in such processing is limited. As a consequence, a frequency band of a character display signal such as a small character having a high frequency component is limited so that it becomes impossible to display such a small character.

SUMMARY OF THE INVENTION

In view of the aforesaid aspect, it is an object of the present invention to provide a character display apparatus in which a frequency band of a character display signal is not limited and small characters, etc. can be displayed satisfactorily.

According to the present invention, three primary color signals from a character generating circuit are written in a line memory by using dot clocks, read out from the line memory by using multiplied clocks, and the thus read out three primary color signals are superimposed upon a video signal and displayed. According to the present invention, a frequency band of a character display signal is not limited and small characters, etc. can be displayed satisfactorily.

According to an aspect of the present invention, there is provided a character display apparatus which is comprised of a character generating circuit, a line memory in which three primary color signals from the character generating circuit are written, and a multiplying circuit for multiplying dot clocks of the three primary color signals from the character generating circuit, wherein the three primary color signals from the character generating circuit are written in the line memory by using the dot clocks, the three primary color signals are read out from the line memory by using multiplied dot clocks from the multiplying circuit and the thus read out three primary color signals are superimposed upon a video signal and displayed.

According to another aspect of the present invention, there is provided a display apparatus which is comprised of a tuner for receiving a television signal, a processing circuit for processing a video signal received from the tuner, a circuit for separating a synchronizing signal from a signal received from the tuner, a character generating circuit for generating a character in three primary color signals synchronized with a predetermined dot clock, a line memory for writing and memorizing the character signals and the dot clock supplied from the character generating circuit therein, a multiplying circuit for multiplying the dot clock supplied from the character generating circuit, wherein the character signals on the three primary color signals are written in the line memory by using the dot clock, the character signals on the three primary color signals are read out from the line memory by using multiplied dot clock supplied from the multiplying circuit, a superimposing circuit for superimposing the character signals on the three primary color signals read out from the line memory by using multiplied dot clock upon the video signal supplied from the processing circuit, and a display for displaying the superimposed signal.

DETAILED DESCRIPTION OF THE PREFERRED EMBODIMENT

Figure 1:
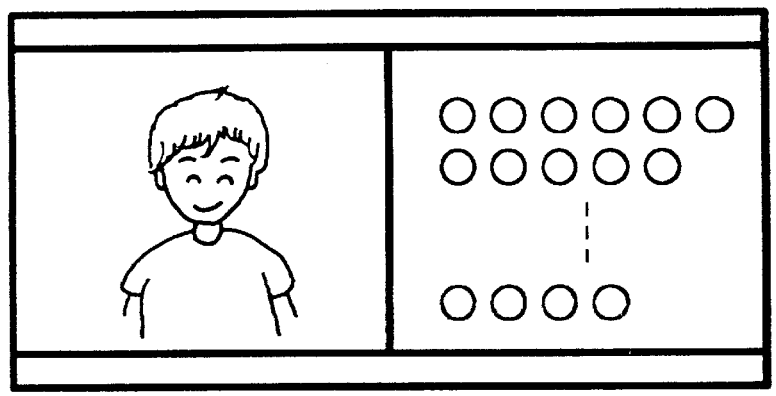
FIG. 1 is a schematic diagram used to explain operation of a television receiver having a cathode-ray tube with a wide aspect ratio.

The present invention will now be described with reference to the drawing.

Figure 2:
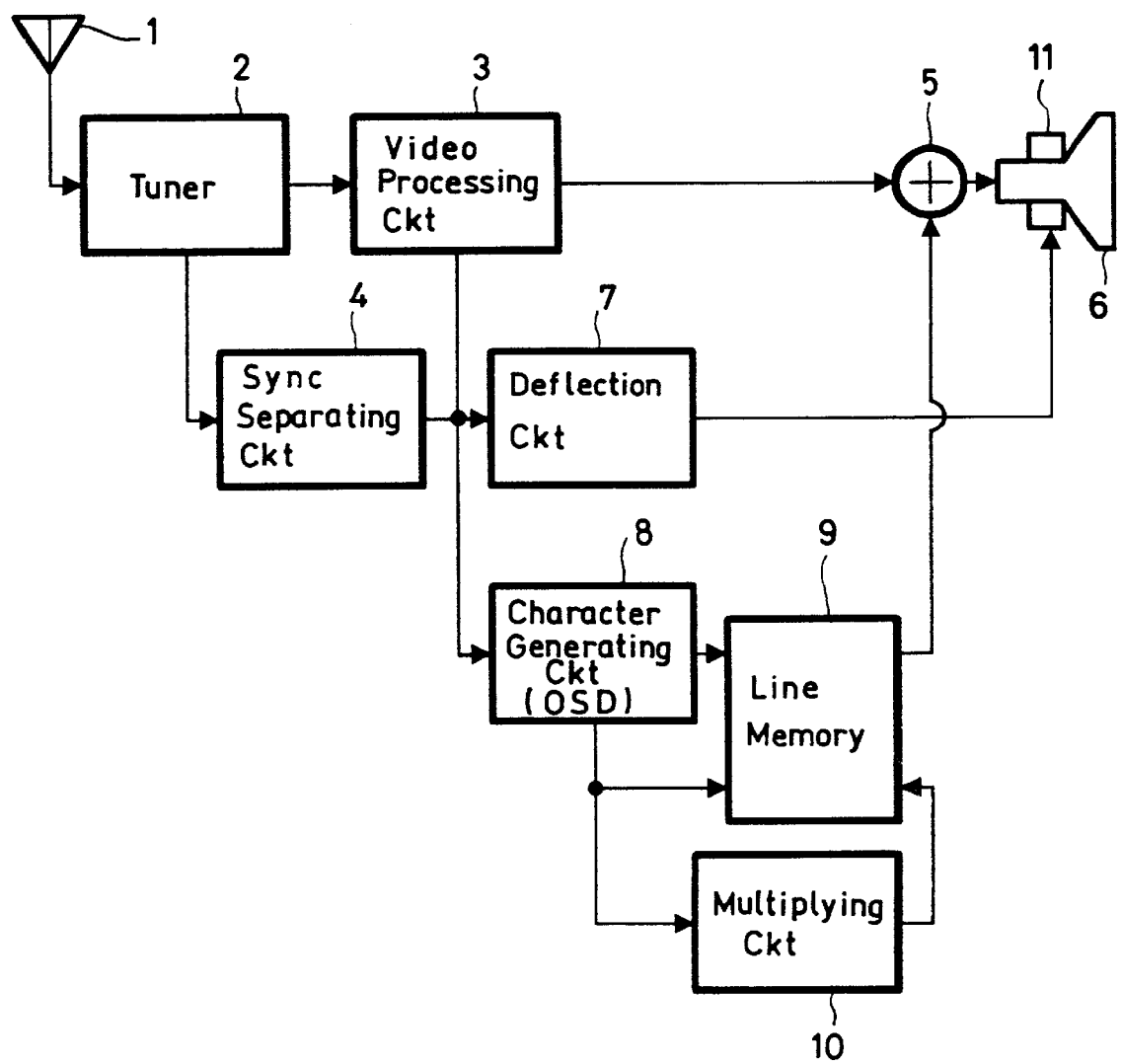
FIG. 2 is a block diagram showing a television receiver to which a character display apparatus according to the present invention is applied.

FIG. 2 is a block diagram showing an example of a television receiver to which there is applied a character display apparatus according to the present invention.

As shown in FIG. 2, a signal received at an antenna 1 is supplied to a tuner 2 and thereby a desired television signal is received. The received video signal is supplied to a video processing circuit 3. A signal from the tuner 2 is supplied to a sync (synchronizing) separating circuit 4, and a sync signal thus separated is supplied to the video processing circuit 3. The video processing circuit 3 processes the video signal supplied thereto in such a manner that a picture is displayed on a plurality of screens such as two display screens not only in a multiple-screen display fashion but also in a double-speed scanning fashion.

The processed video signal is outputted from the video signal processing circuit 3 in the form of three primary color signals. The three primary color signals from the video processing circuit 3 are supplied through a superimposing circuit 5 to a cathode-ray tube (CRT) with a wide aspect ratio, for example. The sync signal from the sync separating circuit 4 is supplied to a deflection circuit 7, and a deflected signal from the deflection circuit 7 is supplied to a deflection coil 11 of the CRT 6 and thereby a video signal is displayed on a display screen of the CRT 6.

The sync signal from sync separating circuit 4 is supplied to a character generating circuit (e.g., on-screen display (OSD)) 8 in which a display signal of arbitrary character is formed by the RGB three primary color signals in synchronism with predetermined dot clocks by the RGB three primary color signals. The display signal thus formed by the character generating circuit 8 is supplied to a line memory 9. The dot clocks from the character generating circuit 8 are supplied to the line memory 9 and the display signal is written in the line memory 9.

The dot clock from the character generating circuit 8 is supplied to a multiplying circuit 10 which generates clocks multiplied with a predetermined multiplying ratio. The thus multiplied clocks are supplied to the line memory 9, whereby the written display signal is read out from the line memory 9. The display signal thus read out from the line memory 9 is supplied to the superimposing circuit 5, in which it is superimposed upon the three primary color signals from the video processing circuit 3. Hence, characters, etc., are displayed on the display screen of the CRT 6.

In this character display apparatus, the display signal read out from the line memory 9 is outputted in the form of a character which is compressed in the horizontal direction in response to the multiplying ratio of the clocks multiplied with the multiplying circuit 10. The thus compressed signal is supplied to the superimposing circuit 5, in which it is superimposed upon the processed video signal and supplied to the CRT 6. Thus, the signal is enlarged and displayed on the display screen of the CRT 6, and hence substantially normal characters can be displayed on the display screen of the CRT 6.

The line memory 9 used in the character display apparatus according to the present invention may be such that data is written in and read out at different cycles independently and asynchronously. Moreover, data is written in and read out from the line memory 9 every time during each horizontal period with respect to a character display signal of one horizontal period each outputted from the character generating circuit 8.

In the character display apparatus, a frequency band of a display signal such as characters is limited only by a drive frequency of the line memory 9 so that a small character having a higher frequency component can be displayed. When the clock exceeds the drive frequency of the line memory 9, if serial data of RGB three primary color signals, for example, is converted into parallel data and inputted to the line memory 9 and the output from the line memory 9 is reconverted into serial data, then it becomes possible to allow a higher frequency band.

Therefore, in this character display apparatus, the three primary color signals from the character generating circuit are written in the line memory by using the dot clocks and read out from the line memory by using the multiplied clocks, whereby the display signal such as characters can be compressed in the horizontal direction. Then, when the thus compressed signal is superimposed upon the video signal and displayed, the frequency band of the character display signal is not limited and small characters can be displayed satisfactorily.

According to the conventional character display apparatus, when a video signal is processed, a frequency band of a signal is limited. Also, according to the conventional character display apparatus, it was very difficult to display small characters having high frequency components. However, according to the present invention, a frequency band of a character display signal is not limited so that small characters can be displayed and pictures can be displayed on a plurality of display screens in a multiple-screen fashion and in a double-speed scanning fashion satisfactorily.

Further, according to the above-mentioned character display apparatus, a character display signal can be compressed with a desired compression ratio by arbitrarily changing a multiplying ratio in the multiplying circuit 10. Therefore, when a picture is displayed on a plurality of display screens in a multiple-screen display fashion and in a double-speed scanning fashion, characters, etc., can be constantly displayed in desired shapes. Further, it becomes possible to compress characters, etc., into desired shapes by arbitrarily controlling a multiplying ratio of dot clocks.

As described above, the character display apparatus according to the present invention comprises the character generating circuit, the line memory in which the three primary color signals from the character generating circuit are written and the multiplying circuit for multiplying dot clocks of the three primary color signals from the character generating circuit, in which the three primary color signals from the character generating circuit are written in the line memory by using the dot clocks, the three primary color signals are read out from the line memory by using multiplied clocks from the multiplying circuit and the thus read out three primary color signals are superimposed upon the video signal and displayed. Therefore, the frequency band of the character display signal is not limited and small characters, etc., can be displayed satisfactorily.

Having described a preferred embodiment of the invention with reference to the accompanying drawings, it is to be understood that the invention is not limited to that precise embodiment and that various changes and modifications could be effected therein by one skilled in the art without departing from the spirit or scope of the invention as defined in the appended claims.

What is claimed is:

1. A character display apparatus comprising:

a character generating circuit;

a line memory for storing three primary color signals from said character generating circuit; and a multiplying circuit for multiplying a plurality of dot clocks of said three primary color signals from said character generating circuit with a multiplying ratio corresponding to a video signal processed in a multiple-screen display fashion and outputting a plurality of multiplied dot clocks, wherein said three primary color signals from said character generating circuit are stored in said line memory using said plurality of dot clocks, said three primary color signals are read out from said line memory using said plurality of multiplied dot clocks output from said multiplying circuit, said three primary color signals are superimposed on said video signal processed in said multiple-screen display fashion and displayed, and said plurality of character signals in said three primary color signals read out from said line memory means using said multiplied dot clock are compressed in a horizontal direction to a ratio corresponding to said multiplying ratio.

2. The character display apparatus as claimed in claim 1, wherein said video signal is processed in a double-speed scanning fashion.

3. A display apparatus comprising:

a tuner for receiving a television signal;

processing means for processing a video signal received from said tuner;

means for separating a synchronizing signal from a signal received from said tuner;

character generating means for generating a plurality of character signals in three primary color signals synchronized with a predetermined dot clock;

line memory means for storing said plurality of character signals and said dot clock supplied from said character generating means therein;

multiplying means for multiplying said dot clock supplied from said character generating means with a multiplying ratio corresponding to a video signal processed in a multiple-screen display fashion and outputting a multiplied dot clock, wherein said plurality of character signals in said three primary color signals are stored in said line memory means using said dot clock, and said plurality of character signals in said three primary color signals are read out from said line memory means using said multiplied dot clock output from said multiplying means;

superimposing means for superimposing said plurality of character signals in said three primary color signals read out from said line memory means using said multiplied dot clock on said video signal processed in said multiple-screen display fashion; and display means for displaying said superimposed signal, wherein said plurality of character signals in said three primary color signals read out from said line memory means using said multiplied dot clock are compressed in a horizontal direction to a ratio corresponding to said multiplying ratio.

4. The display apparatus as claimed in claim 3, wherein said video signal is processed in a multiple-speed scanning fashion by said processing means.

5. The character display apparatus as claimed in claim 1, wherein said three primary color signals are stored in said line memory and read out from said line memory using different cycles, independently and asynchronously.

6. The display apparatus as claimed in claim 3, wherein said plurality of character signals in three primary color signals are stored in said line memory and read out from said line memory using different cycles, independently and asynchronously.

7. The character display apparatus as claimed in claim 1, wherein when said plurality of dot clocks exceeds a drive frequency of said line memory, serial data of said three primary color signals is converted into parallel data by said line memory before said three primary color signals are stored in said line memory, and when said three primary color signals are read out from said line memory, said parallel data is reconverted by said line memory into said serial data.

8. The display apparatus as claimed in claim 3, wherein when said dot clock exceeds a drive frequency of said line memory means, serial data of said three primary color signals is converted into parallel data by said line memory means before said three primary color signals are stored in said line memory means, and when said three primary color signals are read out from said line memory means, said parallel data is reconverted by said line memory means into said serial data.

* * * * *